(12) United States Patent
Yang et al.

(10) Patent No.: US 11,526,734 B2
(45) Date of Patent: Dec. 13, 2022

(54) METHOD AND APPARATUS FOR RECURRENT AUTO-ENCODING

(71) Applicant: QUALCOMM Incorporated, San Diego, CA (US)

(72) Inventors: Yang Yang, San Diego, CA (US); Guillaume Konrad Sautière, Amsterdam (NL); Jongha Ryu, La Jolla, CA (US); Taco Sebastiaan Cohen, Amsterdam (NL)

(73) Assignee: QUALCOMM Incorporated, San Diego, CA (US)

( * ) Notice: Subject to any disclaimer, the term of this patent is extended or adjusted under 35 U.S.C. 154(b) by 430 days.

(21) Appl. No.: 16/841,489

(22) Filed: Apr. 6, 2020

(65) Prior Publication Data

US 2021/0089863 A1    Mar. 25, 2021

Related U.S. Application Data

(60) Provisional application No. 62/906,013, filed on Sep. 25, 2019, provisional application No. 62/923,365, filed on Oct. 18, 2019.

(51) Int. Cl.
*G06N 3/04* (2006.01)
*G06F 3/16* (2006.01)
*G10L 19/16* (2013.01)

(52) U.S. Cl.
CPC .......... *G06N 3/049* (2013.01); *G06F 3/162* (2013.01); *G06F 3/167* (2013.01); *G06N 3/0445* (2013.01); *G06N 3/0454* (2013.01); *G10L 19/173* (2013.01)

(58) Field of Classification Search
CPC ....................................................... G06N 3/04
See application file for complete search history.

(56) References Cited

U.S. PATENT DOCUMENTS

| | | | |
|---|---|---|---|
| 10,432,953 B2* | 10/2019 | Wierstra | G06N 3/0454 |
| 11,069,335 B2* | 7/2021 | Pollet | G06N 3/0454 |
| 11,388,416 B2* | 7/2022 | Habibian | H04N 19/136 |
| 2018/0063538 A1* | 3/2018 | Bernal | G06V 10/25 |
| 2020/0160565 A1* | 5/2020 | Ma | G06N 3/0481 |
| 2020/0364580 A1* | 11/2020 | Shang | G06N 3/006 |

OTHER PUBLICATIONS

Gregor K., et al., "Towards Conceptual Compression", Google DeepMind, London, United Kingdom, Apr. 29, 2016, 14 Pages.

* cited by examiner

*Primary Examiner* — Olisa Anwah
(74) *Attorney, Agent, or Firm* — Qualcomm Incorporated

(57) ABSTRACT

A device includes one or more processors configured to generate, at an encoder portion of an autoencoder, first output data at least partially based on first input data and to generate, at a decoder portion or the autoencoder, a representation of the first input data at least partially based on the first output data. The one or more processors are configured to generate, at the encoder portion, second output data based on second input data and first state data and to generate, at the decoder portion, a representation of the second input data based on the second output data and second state data. Each of the first state data and the second state data correspond to the state of the decoder portion resulting from generation of the representation of the first input data. The first and second input data correspond to sequential values of a signal to be encoded.

30 Claims, 9 Drawing Sheets

METHOD AND APPARATUS FOR RECURRENT AUTO-ENCODING

I. CROSS-REFERENCE TO RELATED APPLICATIONS

The present application claims priority from Provisional Patent Application No. 62/906,013, filed Sep. 25, 2019, entitled "METHOD AND APPARATUS FOR RECURRENT AUTO-ENCODING," and from Provisional Patent Application No. 62/923,365, filed Oct. 18, 2019, entitled "METHOD AND APPARATUS FOR RECURRENT AUTO-ENCODING," the content of each of which is incorporated by reference in its entirety.

II. FIELD

The present disclosure is generally related to signal encoding.

III. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

A computing device can be used for signal encoding. For example, audio signals can be encoded at a first device and communicated to another device. A lower bit-rate of the encoded signal results in a more efficient use of resources, such as transmission resources, memory usage, etc. However, encoding of the audio signal to achieve a lower bit-rate can result in reduced audio quality of a corresponding decoded signal.

IV. SUMMARY

According to one implementation of the present disclosure, a device to perform signal encoding includes one or more processors. The one or more processors are configured to receive a sequence of input data corresponding to sequential values of a signal to be encoded, the sequence of input data including first input data corresponding to a first value of the signal and second input data corresponding to a second value of the signal. The one or more processors are configured to generate, at an encoder portion of an autoencoder, first output data at least partially based on the first input data. The one or more processors are also configured to generate, at a decoder portion or the autoencoder, a representation of the first input data at least partially based on the first output data. The one or more processors are further configured to generate, at the encoder portion, second output data based on the second input data and first state data. The first state data corresponds to a state of the decoder portion resulting from generation of the representation of the first input data. The one or more processors are also configured to generate, at the decoder portion, a representation of the second input data based on the second output data and second state data. The second state data corresponds to the state of the decoder portion resulting from the generation of the representation of the first input data. The one or more processors are further configured to send the first output data and the second output data to at least one of a transmission medium or a storage medium.

According to another implementation of the present disclosure, a method of signal encoding includes receiving a sequence of input data corresponding to sequential values of a signal to be encoded, the sequence of input data including first input data corresponding to a first value of the signal and second input data corresponding to a second value of the signal. The method includes generating, at an encoder portion of an autoencoder, first output data at least partially based on the first input data. The method also includes generating, at a decoder portion or the autoencoder, a representation of the first input data at least partially based on the first output data. The method further includes generating, at the encoder portion, second output data based on the second input data and first state data. The first state data corresponds to a state of the decoder portion resulting from generation of the representation of the first input data. The method also includes generating, at the decoder portion, a representation of the second input data based on the second output data and second state data. The second state data corresponds to the state of the decoder portion resulting from the generation of the representation of the first input data. The method further includes sending the first output data and the second output data to at least one of a transmission medium or a storage medium.

According to another implementation of the present disclosure, a non-transitory computer-readable medium includes instructions that, when executed by one or more processors of a device, cause the one or more processors to receive a sequence of input data corresponding to sequential values of a signal to be encoded, the sequence of input data including first input data corresponding to a first value of the signal and second input data corresponding to a second value of the signal. The instructions, when executed by the one or more processors, cause the one or more processors to generate, at an encoder portion of an autoencoder, first output data at least partially based on the first input data. The instructions, when executed by the one or more processors, cause the one or more processors to also generate, at a decoder portion or the autoencoder, a representation of the first input data at least partially based on the first output data. The instructions, when executed by the one or more processors, cause the one or more processors to further generate, at the encoder portion, second output data based on the second input data and first state data. The first state data corresponds to a state of the decoder portion resulting from generation of the representation of the first input data. The instructions, when executed by the one or more processors, cause the one or more processors to also generate, at the decoder portion, a representation of the second input data based on the second output data and second state data. The second state data corresponds to the state of the decoder portion resulting from the generation of the representation of the first input data. The instructions, when executed by the one or more processors, cause the one or more processors to further send the first output data and the second output data to at least one of a transmission medium or a storage medium.

According to another implementation of the present disclosure, an apparatus includes means for generating output data based on input data and first state data. The apparatus also includes means for generating a representation of the input data based on the output data and second state data. The apparatus further includes means for sending the output data to at least one of a transmission medium or a storage medium. The first state data corresponds to a state, of the means for generating the representation of the input data, resulting from generation of a representation of prior input data. The prior input data and the input data corresponding to sequential values of a signal to be encoded. The second state data corresponds to the state, of the means for generating the representation of the input data, resulting from the generation of the representation of the prior input data.

V. BRIEF DESCRIPTION OF THE DRAWINGS

VI. DETAILED DESCRIPTION

Figure 1:
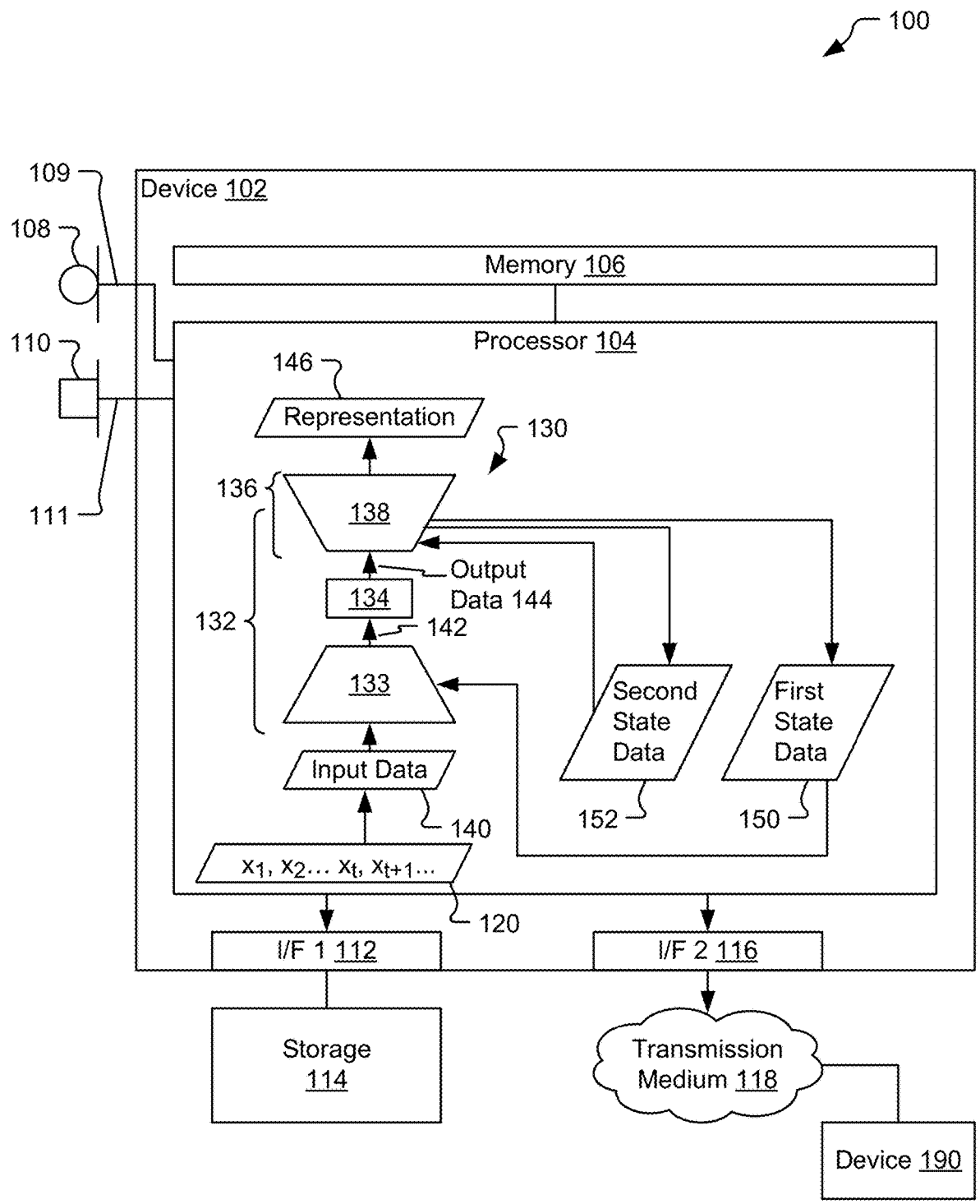
FIG. 1 is a diagram of a particular illustrative implementation of a system including a device with a feedback recurrent autoencoder operable to perform signal encoding.

Devices and methods to perform signal encoding are described. In a particular example, a recurrent autoencoder architecture, referred to as a feedback recurrent autoencoder ("FRAE"), is described with application to the compression of sequential data with temporal correlation. The recurrent structure of FRAE is configured to efficiently extract the redundancy embedded along the time-dimension of sequential data and enable compact discrete representation of the data at the bottleneck in a sequential fashion.

In a particular example, an audio signal corresponds to a temporally correlated signal $x=\{x_1, x_2, \ldots, x_t, \ldots\}$, for which $x_t$ is referred to as signal x in time frame t. An autoencoder includes an encoder portion and a decoder portion. The encoder portion includes a first neural network and a quantizer. The decoder portion includes a second neural network. A simple architecture of an autoencoder follows a forward-only design that treats each data point $x_t$ independently. In this architecture, the network operation is decoupled in time dimension—the quantized representation is generated based on a single frame and is used to reconstruct that frame alone.

Audio frames generally have time-domain correlations (e.g., the same sound may be repeated in multiple frames). Time-domain correlation between frames can be used for bit-rate reduction without compromising the reconstruction quality. For example, time-domain coupling can be introduced by adding recurrent connections on top of a forward-only structure of an autoencoder. A goal of adding the recurrent connections includes enabling the use of both the latent code associated with a particular time frame (e.g., $x_{t+1}$) as well as history information (e.g., associated with $x_t$) for data reconstruction.

There are multiple implementations of adding recurrent connections. In a first example, recurrent connections are added to the encoder portion without adding recurrent connections to the decoder portion. In this example, the encoder portion has access to the history information (e.g., associated with $x_t$) to form the latent code associated with the particular time frame (e.g., $x_{t+1}$) and the decoder has access to the quantized codes associated with the particular time frame (e.g., $x_{t+1}$). The encoder portion would have to provide all the information for reconstructing the data to the decoder portion for each single time instance and thus there is no temporal dependency.

Similarly, in a second example, recurrent connections are added to the decoder portion without adding recurrent connections to the encoder portion. In this example, the encoder portion generates each latent code associated with the particular time frame (e.g., $x_{t+1}$) and not based on history information (e.g., associated with $x_t$) and thus there is no temporal dependency.

In a third example, recurrent connections are added to the encoder portion and the decoder portion without feeding some of the decoder states back to the encoder portion. In this example, each of the encoder portion and the decoder portion uses history information. However, there is a mismatch between first history information accessible to the encoder portion and second history information accessible to the decoder portion. For example, the encoder portion has access to first history information indicating a running state summarizing previous data that is encoded, whereas the decoder portion has access to second history information indicating a running state summarizing previously received quantized latent codes. Since the quantization operation can lead to information loss, the second history information that is accessible to the decoder portion can be a lossy version of the first history information accessible to the encoder portion. Due to the mismatch, the encoder portion may be unable to construct latent codes that are more closely tailored to the decoder portion's history context (e.g., the second history information). To bridge the gap between the history information available at the encoder portion and at the decoder portion, some of the decoder information (e.g., the second history information) can be fed back to the encoder portion.

Illustrative examples of providing the decoder information (e.g., the second history information) to the encoder portion are described. In a fourth example, a quantized latent code associated with a previous time frame (e.g., $x_t$) is provided as input to the encoder portion. In a fifth example, reconstructed data associated with the previous time-step (e.g., $x_t$) is provided as input to the encoder portion. In a sixth example, a recurrent state of the decoder portion associated with the previous time-step (e.g., $x_t$) is provided to the encoder portion. Each of the fourth, fifth, and sixth examples enables exploitation of temporal correlation in data. The fourth example and the fifth example, however, enable single time-step extrapolation. In the third example and the fourth example, the encoder portion has access to two-time-step information—the reconstructed data (or quantized code) from the previous time frame (e.g., $x_t$) as well as the data for the particular time frame (e.g., $x_{t+1}$).

In the sixth example, a hidden state of the decoder portion is fed back as input to the encoder portion. Assuming that a decoder hidden state contains a prediction (e.g., an extrapolated estimate) of a next frame based on previously decoded frames, the encoder portion can use the prediction to form a compact set of codes that carry the information regarding a residual corresponding to a difference between the data associated with the particular time frame (e.g., $x_{t+1}$) and the prediction for the particular time frame. The decoder portion can combine the prediction together with the codes to form the reconstruction output as well as updating an extrapolation at the decoder portion for the next time frame, forming an end-to-end trainable predictive coder.

The principles described herein may be applied, for example, to an audio device, a communication device, or a component of a device that is configured to perform signal encoding. Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, smoothing, and/or selecting from a plurality of values. Unless expressly limited by its context, the term "obtaining" is used to indicate any of its ordinary meanings, such as calculating, deriving, receiving (e.g., from another component, block or device), and/or retrieving (e.g., from a memory register or an array of storage elements).

Unless expressly limited by its context, the term "producing" is used to indicate any of its ordinary meanings, such as calculating, generating, and/or providing. Unless expressly limited by its context, the term "providing" is used to indicate any of its ordinary meanings, such as calculating, generating, and/or producing. Unless expressly limited by its context, the term "coupled" is used to indicate a direct or indirect electrical or physical connection. If the connection is indirect, there may be other blocks or components between the structures being "coupled". For example, a loudspeaker may be acoustically coupled to a nearby wall via an intervening medium (e.g., air) that enables propagation of waves (e.g., sound) from the loudspeaker to the wall (or vice-versa).

The term "configuration" may be used in reference to a method, apparatus, device, system, or any combination thereof, as indicated by its particular context. Where the term "comprising" is used in the present description and claims, it does not exclude other elements or operations. The term "based on" (as in "A is based on B") is used to indicate any of its ordinary meanings, including the cases (i) "based on at least" (e.g., "A is based on at least B") and, if appropriate in the particular context, (ii) "equal to" (e.g., "A is equal to B"). In the case (i) where A is based on B includes based on at least, this may include the configuration where A is coupled to B. Similarly, the term "in response to" is used to indicate any of its ordinary meanings, including "in response to at least." The term "at least one" is used to indicate any of its ordinary meanings, including "one or more". The term "at least two" is used to indicate any of its ordinary meanings, including "two or more".

The terms "apparatus" and "device" are used generically and interchangeably unless otherwise indicated by the particular context. Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The terms "method," "process," "procedure," and "technique" are used generically and interchangeably unless otherwise indicated by the particular context. The terms "element" and "module" may be used to indicate a portion of a greater configuration. The term "packet" may correspond to a unit of data that includes a header portion and a payload portion. Any incorporation by reference of a portion of a document shall also be understood to incorporate definitions of terms or variables that are referenced within the portion, where such definitions appear elsewhere in the document, as well as any figures referenced in the incorporated portion.

As used herein, the term "communication device" refers to an electronic device that may be used for voice and/or data communication over a wireless communication network. Examples of communication devices include speaker bars, smart speakers, cellular phones, personal digital assistants (PDAs), handheld devices, headsets, wireless modems, laptop computers, personal computers, etc.

FIG. 1 depicts a system 100 that includes a device 102 that is configured to perform signal encoding. The device 102 is coupled to a microphone 108, a camera 110, and a storage medium 114 (e.g., a data storage device). The device 102 is also coupled to a second device 190 via a transmission medium 118, such as one or more wireless networks, one or more wired networks, or a combination thereof.

The device 102 includes one or more processors (referred to herein as "processor") 104 coupled to a memory 106, a first interface ("I/F 1") 112, and a second interface ("I/F 2") 116. The processor 104 is configured to receive audio data 109 from the microphone 108, image data 111 from the camera 110, or a combination thereof. The processor 104 is coupled to the storage medium 114 via the first interface 112 (e.g., via a memory bus) and is coupled to the transmission medium 118 via the second interface 116 (e.g., a network interface device, a wireless transceiver and antenna, one or more other network interface devices, or a combination thereof).

Figure 4:
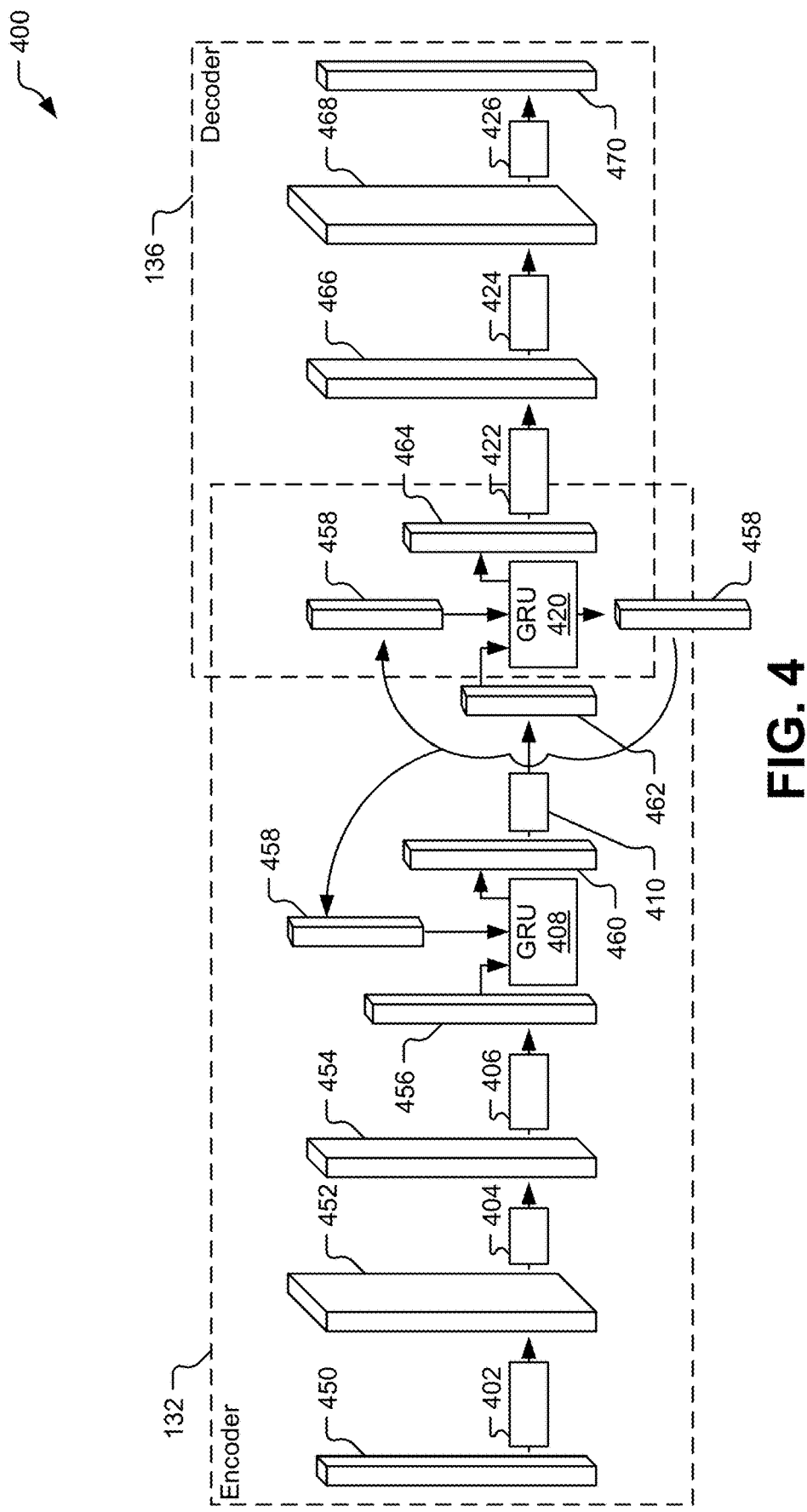
FIG. 4 is a diagram of another particular implementation of components that may be incorporated in the feedback recurrent autoencoder of FIG. 2.

The processor 104 includes an autoencoder 130 that includes an encoder portion 132 and a decoder portion 136 that partially overlap each other, indicating that some components of the autoencoder 130 are used in both encoding and decoding, as described further with reference to FIG. 4. The encoder portion 132 is configured to receive input data 140 and to process the input data 140 to generate output data 144 at least partially based on the input data 140. In an illustrative example, the encoder portion 132 is configured to generate the output data 144 based on the input data 140 and first state data 150, as described further below. In some implementations, the encoder portion 132 is configured to perform lossy compression of the input data 140 to generate the output data 144, so that the output data 144 has fewer bits than the input data 140.

In a particular implementation, the encoder portion 132 includes a first neural network 133 and a quantizer 134. The first neural network 133 includes one or more convolutional neural networks, one or more fully-connected neural networks, one or more gated recurrent units (GRUs), or any combination thereof, that generates intermediate data 142 that is input to the quantizer 134. An example of components that may be included in the encoder portion 132 is illustrated in FIG. 4.

The decoder portion 136 is configured to receive the output data 144 and to process the output data 144 to generate a representation 146 of the input data 140 at least partially based on the output data 144. In an illustrative example, the decoder portion 136 is configured to generate the representation 146 based on the output data 144 and second state data 152, as described further below. The decoder portion 136 includes a second neural network 138 that may include one or more convolutional neural networks, one or more fully-connected neural networks, one or more gated recurrent units (GRUs), or any combination thereof. An example of components that may be included in the decoder portion 136 is illustrated in FIG. 4.

The first state data 150 and the second state data 152 correspond to a state of the decoder portion 136 resulting from generation of the representation 146 for one set of input data 140. The first state data 150 and the second state data 152 are provided as input to the encoder portion 132 and the decoder portion 136, respectively, for a next sequential set of input data 140. In an illustrative example, the state of the decoder portion 136 represented in the state data 150, 152 includes one or more values of nodes within the second neural network 138. As a result, the autoencoder 130 operates as a feedback recurrent autoencoder that can be trained to reduce (e.g., minimize) a difference between the input data 140 and the representation 146 of the input data 140 over a large training set. In some implementations, the first state data 150 matches the second state data 152; however, in other implementations the first state data 150 can differ from the second state data 152.

The structure of the autoencoder 130 can be interpreted as a non-linear predictive coding scheme, where the state data 150, 152 ($h_t$) resulting from processing input data ($x_t$) at a particular time (or sequence index) t captures information regarding a prediction of a next sequential input data ($x_{t+1}$). The encoder portion 132 may be trained to utilize the prediction to form a compact code ($z_{t+1}$) that only carries the residual information regarding $x_{t+1}$. For example, the compact code ($z_{t+1}$) corresponds to a difference between the next sequential input data ($x_{t+1}$) and the prediction. The decoder portion 136 may be trained to combine the information regarding the prediction with the compact code $z_{t+1}$ to both generate the representation ($\hat{x}_{t+1}$) of the data $x_{t+1}$ as well as embed its next step prediction in the state data ($h_{t+1}$) 150, 152.

In a compression implementation, the encoding operation involves part of the decoder network up to the generation of decoder recurrent state data 150, 152. Such implementation resembles an analysis-by-synthesis, as the encoding process carries out decoding operations during code generation. The bit-rate of compression may be controlled by the dimension of the bottleneck together with the codebook size in each dimension.

The processor 104 (e.g., the autoencoder 130) receives a sequence 120 of input data corresponding to sequential values of a signal to be encoded, such as the audio data 109. The sequence of input data includes first input data (e.g., $x_t$) corresponding to a first value of the signal and second input data (e.g., $x_{t+1}$) corresponding to a second value of the signal. Each value in the sequence 120 may be sequentially input to the autoencoder 130 as the input data 140. In an implementation in which the sequence 120 of input data corresponds to sequential samples of an audio signal that may exhibit time correlation, using the state of the decoder portion 136 for one sample of the audio signal as an input to both the encoder portion 132 and the decoder portion 136 when processing the next sample of the audio signal can increase the compression ratio (e.g., the number of bits in the input data 140 as compared to the number of bits in the output data 144) by enabling the autoencoder 130 to account for correlations between the sequential samples. As an illustrative example, the state data 150, 152 may function as an input that enables the encoder portion 132 and the decoder portion 136 to generate a prediction for the next sample of a series of samples, and the encoder portion 132 can encode the residual (e.g., a difference between the next sample and the prediction of the next sample) as the output data 144 at a reduced bit rate as compared to encoding the output data 144 without taking into account the history of the decoder portion 136.

The processor 104 is configured to send the output data 144 to at least one of the transmission medium 118 or the storage medium 114. For example, the output data 144 may be stored at the storage medium 114 for later retrieval and decompression at the decoder portion 136 to generate the representation 146 of the input data 140 as reconstructed data, such as for playback of audio data or video data that has been encoded to the output data 144. In some implementations, the output data 144 may be decoded at another decoder device that matches the decoder portion 136 (e.g., in the device 102 or in another device) to generate the representation 146 of the input data 140 as reconstructed data. As another example, the second device 190 may include a decoder that matches (or substantially matches) the decoder portion 136, and the output data 144 may be transmitted via the transmission medium 118 to generate the representation 146 of the input data 140 as reconstructed data at the second device 190.

In some implementations, the camera 110 is configured to provide the image data 111 (e.g., a video data stream) to the processor 104 for encoding at the autoencoder 130. In other implementations, the microphone 108 (e.g., at least one microphone of an array of microphones) is configured to provide the audio data 109 to the processor 104 for encoding at the autoencoder 130. In some implementations, the processor 104 is configured to process the audio data 109 to generate the input data 140, such as by determining a spectral characteristic of the audio data 109 and providing the spectral characteristic of each portion (e.g., frame) of the audio data 109 to the autoencoder 130 as the sequence 120 of input data, as described further with reference to FIG. 5.

By using the state of the decoder portion 136 for one set of input data during processing of the next set of input data, the autoencoder 130 can perform enhanced compression as compared to autoencoders that do not take into account the history of the decoder portion 136 when encoding a sequence of potentially correlated data. As a result, encoded data can be stored using a reduced amount of storage space, transmitted using a reduced amount of network bandwidth or at a higher transmission rate, or any combination thereof.

Although FIG. 1 illustrates a particular implementation of a system that includes the autoencoder 130, the autoencoder 130 can be implemented in other systems. As an example, the autoencoder 130 can be incorporated into a portable electronic device that includes the memory 106 coupled to the processor 104 and configured to store instructions executable by the processor 104, and a wireless transceiver coupled to an antenna and to the processor 104 and operable to transmit the output data 144 to a remote device, such as described with reference to FIG. 10. As another example, the processor 104 is incorporated into a base station, such as described with reference to FIG. 9.

Figure 2:
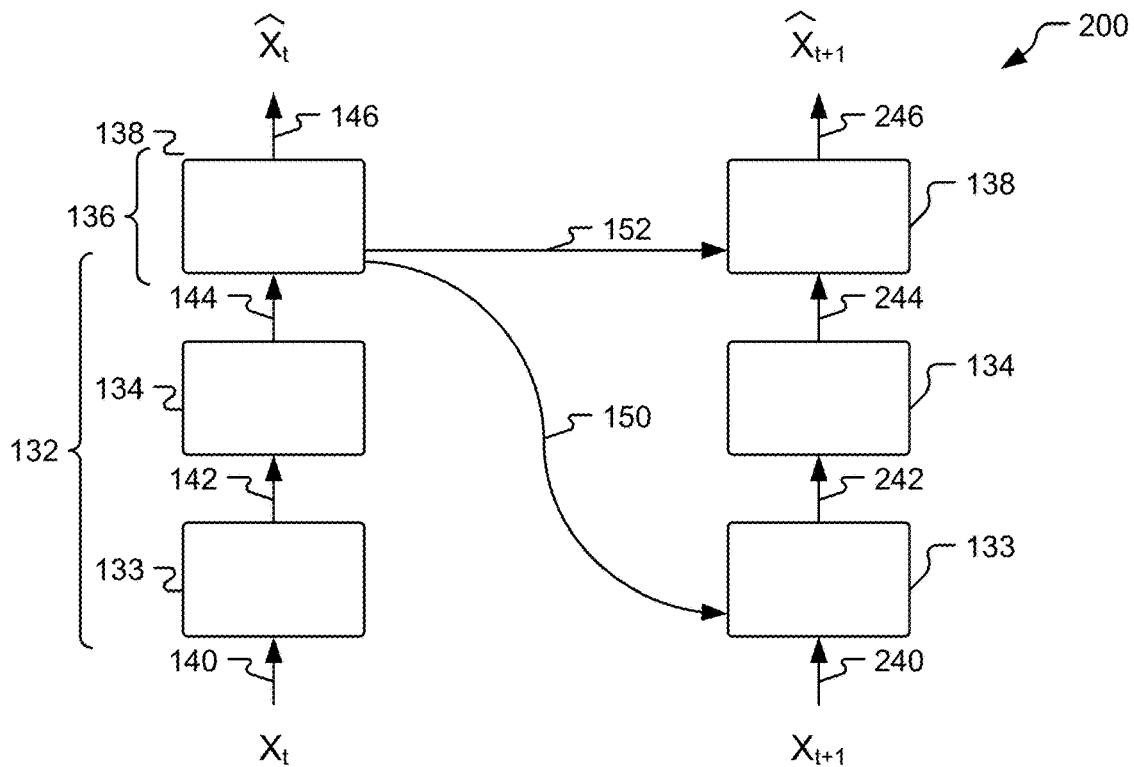
FIG. 2 is a diagram of a particular example of operation of a feedback recurrent autoencoder that may be incorporated in the device of FIG. 1.

FIG. 2 illustrates a particular example of an implementation 200 of the autoencoder 130 processing first input data 140 ("$X_t$") at a first time "t" to generate the representation 146 ("$\hat{X}_t$") of the first input data 140. The first state data 150 is provided to the first neural network 133 and the second state data 152 is provided to the second neural network 138 for processing of second input data 240 ("$X_{t+1}$") at a second time "t+1" to generate a representation 246 ("$\hat{X}_{t+1}$") of the second input data 240. To illustrate, the first neural network 133 generates intermediate data 242 based on the second input data 240 and the first state data 150, and the quantizer 134 processes the intermediate data 242 to generate second output data 244. The decoder portion 136 (e.g., the second neural network 138) generates the representation 246 of the second input data 240 based on the second output data 244 and the second state data 152.

Figure 3:
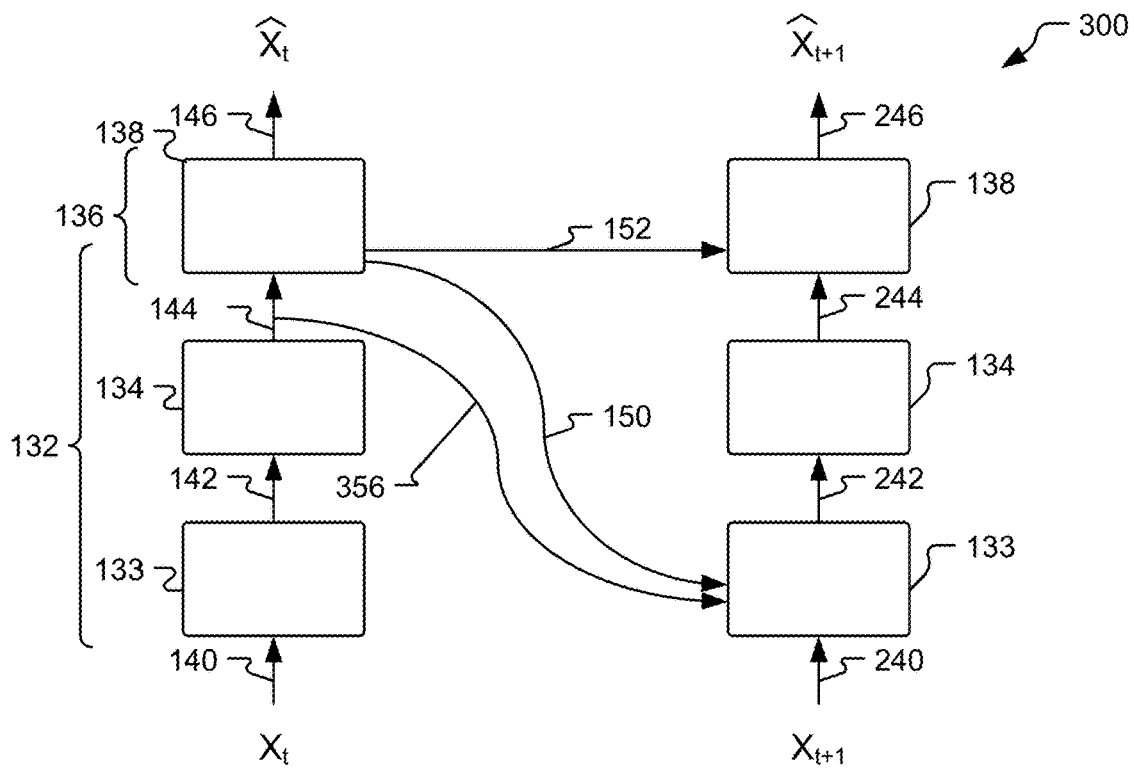
FIG. 3 is a diagram of another particular example of operation of another feedback recurrent autoencoder that may be incorporated in the device of FIG. 1.

FIG. 3 illustrates a particular example of an implementation 300 of the autoencoder 130 that differs from the implementation 200 of FIG. 2 in that the encoder portion 132 is configured to generate the second output data 244 further based on the first output data 144, illustrated as additional input data 356 to the first neural network 133. Providing the first output data 144 resulting from the first input data 140 ("$X_t$") to the encoder portion 132 for processing of the second input data 240 ("$X_{t+1}$") may enhance a performance (e.g., enhanced accuracy, increased compression, or both) of the autoencoder 130 by providing to the encoder portion 132 additional information (e.g., input data information) regarding the state of the decoder portion 136 corresponding to generation of the representation 146 ("$\hat{X}_t$") of the first input data 140.

FIG. 4 illustrates a particular example of an implementation 400 of the autoencoder 130 that includes two recurrent units before and after the bottleneck quantization. The encoder portion 132 includes a neural network 402, such as a convolutional neural network (e.g., layer) with a rectifier linear unit, configured to receive input data 450 (e.g., the input data 140) and generate data 452. A neural network 404, such as a convolutional neural network with a rectifier linear unit, is configured to receive the data 452 and generate data 454. A neural network 406, such as a fully-connected neural network, is configured to receive the data 454 and generate data 456.

A recurrent neural network 408, such as a gated recurrent unit ("GRU 408"), is configured to receive the data 456 and state data 458 (described further below) to generate data 460 and may be used for gradient vanishing or gradient explosion avoidance. A neural network 410, such as a fully-connected neural network, is configured to receive the data 460 and generate data 462 (e.g., bottleneck). The data 462 may correspond to the output data 144. As illustrated in FIG. 4, relative sizes and dimensions of the data at different parts of the encoder portion 132 (and the decoder portion 136) are illustrated to facilitate understanding but should not be considered as drawn to scale or otherwise limiting.

The data 462 is received at a GRU 420 (or other recurrent neural network) that is configured to receive the data 462 and the state data 458 to generate data 464. The state data 458 represents a state of the GRU 420 that is fed back to the GRU 408 and the GRU 420 for processing of a next data input to the autoencoder 130 and corresponds to the state data 150, 152 of FIG. 1. Although the recurrent neural networks 408, 420 are depicted proximate to the bottleneck in the illustrated implementation, in other implementations one or more recurrent networks may be implemented at other locations in the encoder portion 132, the decoder portion 136, or both.

A neural network 422, such as a fully-connected neural network, is configured to receive the data 464 and generate data 466. A neural network 424, such as a rectifier linear unit and convolutional neural network, is configured to receive the data 466 and generate data 468. A neural network 426, such as a rectifier linear unit and convolutional neural network, is configured to receive the data 466 and generate data 470 that corresponds to a representation of the input data 450 (e.g., the representation 146 of FIG. 1).

The recurrent structure of the autoencoder 130 as depicted in the various implementations of FIGS. 1-4 can reduce the compression rate of data at the same distortion (e.g., a difference of the representation of input data as compared to the input data) as compared to non-recurrent autoencoder structures. The recurrent autoencoder structure can lead to more stable training as compared to a non-recurrent counterpart autoencoder.

Although FIG. 4 depicts the autoencoder 130 as including both the encoder portion 132 and the decoder portion 136, in other implementations a device may include one of the encoder portion 132 or the decoder portion 136. For example, an encoder/transmitter device that includes the encoder portion 132 may be configured to encode sequential data (e.g., audio data or video data) and to transmit the encoded data (e.g., a sequence of encoded data that includes a version of the data 462 that is generated for each frame of sequential input data) to a receiving device via a bus or network. The encoder/transmitter device may include the neural networks 402-420 and omit the neural networks 422-426.

For example, an encoder/transmitter device to perform signal encoding can include one or more processors configured to implement the encoder portion 132 using an encoder that includes the neural networks 402-410 and using a partial decoder that includes the GRU 420 but omits the neural networks 422-426. The partial decoder performs a portion of a decoding operation by generating the data 464 and the state data 458 but without generating the data 466-470. Upon receiving first input data (e.g., the input data 140 of FIG. 2), the one or more processors generate, at the encoder, first output data (e.g., the output data 144 of FIG. 2) at least partially based on first input data. The one or more processors also perform a portion of a first decoding operation at least partially based on the first output data to generate first state data (e.g., the first state data 150) and second state data (e.g., the second state data 152). The first state data and the second state data each correspond to a state of the partial decoder resulting from performing the portion of the first decoding operation. In the specific example of FIG. 4, both the first state data and the second state data correspond to the state data 458 after processing the first input data.

Upon receiving second input data (e.g., the second input data 240 of FIG. 2), the one or more processors generate, at the encoder, second output data (e.g., the second output data 244) based on second input data and the first state data. The one or more processors also perform, at the partial decoder, a portion of a second decoding operation based on the second output data and the second state data and send the first output data and the second output data to at least one of a transmission medium or a storage medium.

As another example, a receiver/decoder device that includes the decoder portion 136 may be configured to receive encoded data (e.g., a sequence of encoded data that includes a version of the data 462 for each frame of sequential input data to be reconstructed), such as via a bus or network, and to process the encoded data to generate output sequential data (e.g., a sequence of frames of audio data or video data). The receiver/decoder device may include the neural networks 420-426 and may omit the neural networks 402-410.

For example, a receiver/decoder device may include one or more processors configured to implement a decoder (e.g., the decoder portion 136 that includes the GRU 420 and the neural networks 422-426 and omits the neural networks 402-410). The one or more processors are configured to receive first encoded data and second encoded data from at least one of a transmission medium or a storage medium. To illustrate, the first encoded data can correspond to the output data 144 of FIG. 2 and the second encoded data can correspond to the output data 244 of FIG. 2 that were encoded by another device and later received at the receiver/decoder device for playback.

The decoder performs a first decoding operation to generate a representation of first data (e.g., the representation 146) at least partially based on the first encoded data. The decoder also performs a second decoding operation to generate a representation of second data (e.g., the representation 246) based on the second encoded data and state data. The state data corresponds to a state of the decoder (e.g., the second state data 152) resulting from performing the first decoding operation.

Figure 5:
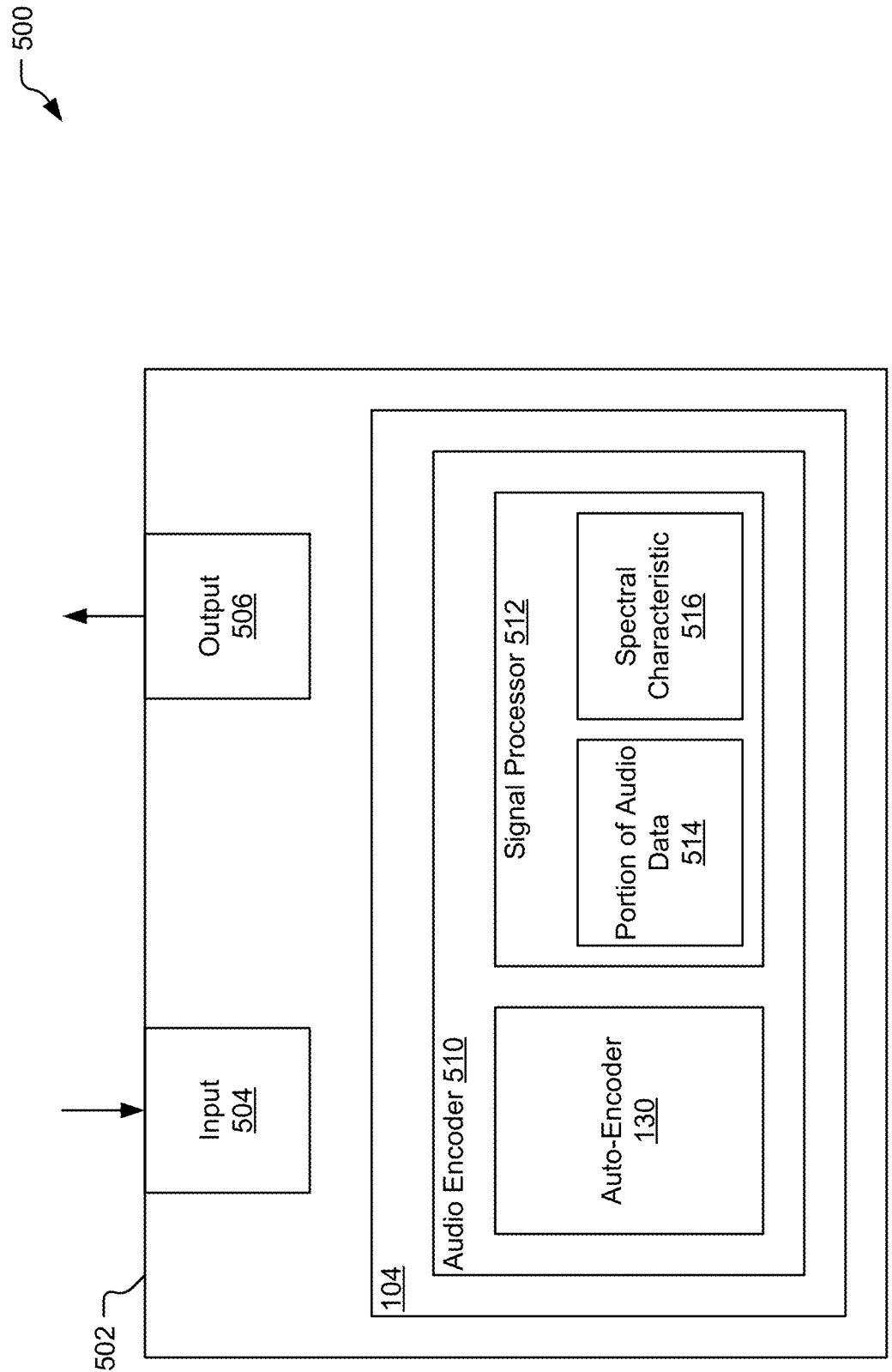
FIG. 5 is a diagram of a particular implementation of components that may be incorporated in the device of FIG. 1.

FIG. 5 depicts an implementation 500 in which the processor 104 including the autoencoder 130 is incorporated into a device 502. The device 502 also includes an input interface 504 (e.g., one or more bus or wireless interfaces) configured to receive input data, such as the audio data 109, and an output interface 506 (e.g., one or more bus or wireless interfaces) configured to output data, such as the output data 144 corresponding to an encoded (e.g., compressed) version of the audio data 109. The device 502 may correspond to a system-on-chip or other modular device that can be implemented into other systems to provide audio encoding, such as within a mobile phone or other communication device or an entertainment system of a vehicle, as an illustrative, non-limiting examples.

In the illustrated implementation 500, the processor 104 includes an audio encoder 510, and the autoencoder 130 is included in the audio encoder 510. The audio encoder 510 further includes a signal processor 512. The signal processor 512 is configured to generate the input data 140 for the autoencoder 130 based on a spectral characteristic 516 of at least a portion 514 of the audio data 109 (e.g., one or more audio frames or portions of an audio frame). The input data 140 corresponds to the audio data 109 received at the one or more processors 104 and represents the spectral characteristic 519 of the portion 514 of the audio data 109.

Figure 6:
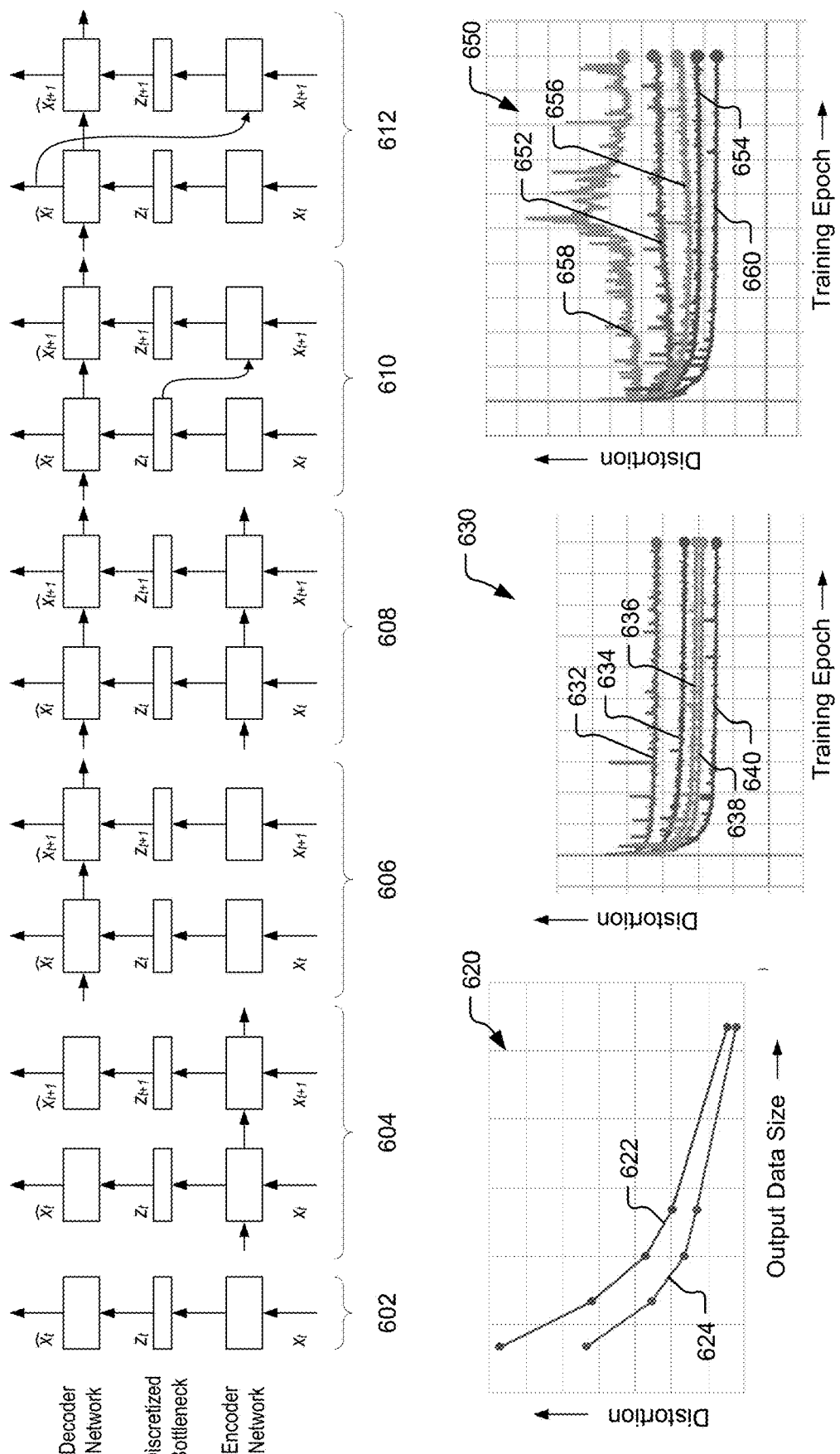
FIG. 6 is a diagram illustrating multiple autoencoder architectures and graphs depicting comparisons of various autoencoder architectures to the feedback recurrent autoencoder of FIG. 2.

FIG. 6 depicts various autoencoder architectures and graphs comparing performance of with the autoencoder implementation 200 of FIG. 2. A first autoencoder architecture 602 has a feed-forward only architecture to independently encode and decode data at each time-step. A second autoencoder architecture 604 includes a recurrent connection only at the encoder, and a third autoencoder architecture 606 includes a recurrent connection only at the decoder. A fourth autoencoder architecture 608 includes recurrent connections at the encoder and at the decoder. In a fifth autoencoder architecture 610 the discretized code $z_t$ is fed back to the encoder for processing of the next sequential input $x_{t+1}$, and in a sixth autoencoder architecture 612 the reconstructed output $\hat{x}_t$ is fed back to the encoder for processing of the next sequential input $x_{t+1}$.

A first graph 620 illustrates an example of performance, showing distortion (e.g., mean squared error (MSE) of the reconstructed output $\hat{x}_{t+1}$ as compared to the input $x_{t+1}$) on the vertical axis versus the size of the output data (e.g., the output data 144) on the horizontal axis, using arbitrary units for both axes. A first curve 622 corresponds to the first autoencoder architecture 602, and a second curve 624 corresponds to the implementation 200 of FIG. 2. As illustrated, the implementation 200 exhibits lower distortion using the same output data size (e.g., at the same compression rate) as the first autoencoder architecture 602, a smaller output data size (e.g., a higher compression rate) at the same distortion, or a combination thereof.

A second graph 630 illustrates an example of training stability, showing distortion on the vertical axis versus number of training epochs on the horizontal axis, using arbitrary units for both axes. A first curve 632 corresponds to the training loss of autoencoder architecture 200 at a fixed bitrate of 0.8 kbps. A second curve 634 corresponds to the training loss of autoencoder architecture 200 at a fixed bitrate of 1.6 kbps. A third curve 636 corresponds to the training loss of autoencoder architecture 200 at a fixed bitrate of 2.4 kbps. A fourth curve 638 corresponds to the training loss of autoencoder architecture 200 at a fixed bitrate of 3.2 kbps. A fifth curve 640 corresponds to the training loss of autoencoder architecture 200 at a fixed bitrate of 6.4 kbps A third graph 650 illustrates another example of training stability, showing distortion on the vertical axis versus number of training epochs on the horizontal axis, using arbitrary units for both axes. A first curve 652 corresponds to the training loss of autoencoder architecture 602 at a fixed bitrate of 0.8 kbps. A second curve 654 corresponds to the training loss of autoencoder architecture 602 at a fixed bitrate of 1.6 kbps. A third curve 656 corresponds to the training loss of autoencoder architecture 602 at a fixed bitrate of 2.4 kbps. A fourth curve 658 corresponds to the training loss of autoencoder architecture 602 at a fixed bitrate of 3.2 kbps. A fifth curve 660 corresponds to the training loss of autoencoder architecture 602 at a fixed bitrate of 6.4 kbps Although particular examples of the autoencoder 130 are described with reference to FIGS. 1-6, other particular examples of the autoencoder 130 may be implemented. For example, some implementations may include a clockwork recurrent neural network (e.g., instead of the GRUs of FIG. 4). In an illustrative example, the encoder portion 132 includes a first clockwork recurrent neural network configured to receive the first state data 150 and the decoder portion 136 includes a second clockwork recurrent neural network configured to receive the second state data 152. The clockwork recurrent neural networks enable further reduced bit-rate (e.g., higher compression) by having codes that different time-scales, providing multi-time compression (e.g., latent variables with a time-scale hierarchy).

Figure 7:
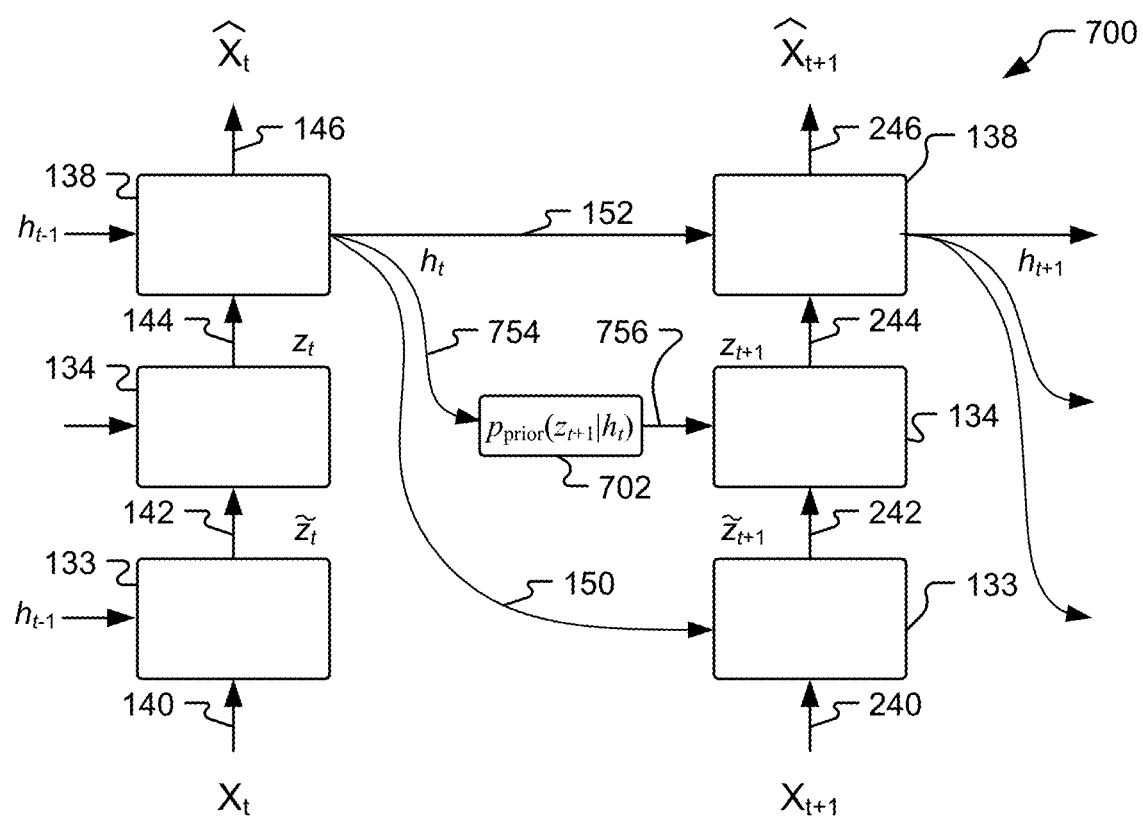
FIG. 7 is a diagram illustrating operation of a feedback recurrent variational autoencoder that may be incorporated in the device of FIG. 1.

FIG. 7 depicts another example in which the autoencoder 130 includes a variational autoencoder. To illustrate, a model may be generated (e.g., learned) based on the latent (e.g., corresponding to the quantizer 134), enabling variable bit-rate compression. For example, a probabilistic model may be generated based on a frequency that each value of the quantized latent occurs.

In a lossy source compression setting where the latent code is used to represent the data and the encoder is deterministic, it can be shown that optimizing for rate-distortion trade-off is equivalent to optimizing β-VAE objective:

$$\mathbb{E}_{q(z|x)}\left[\log\frac{1}{p(x|z)}\right] + \beta \cdot D_{KL}(q(z|x)\|p_{prior}(z)) = \qquad \text{Equation (1)}$$
$$\log\frac{1}{p(x|z(x))} + \beta \cdot \log\frac{1}{p_{prior}(z(x))} - \beta \cdot H(q(z|x)).$$

In Equation (1), $$\log\frac{1}{p(x|z(x))}$$

corresponds to distortion, $$\log\frac{1}{p_{prior}(z(x))}$$

corresponds to rate (code-length of z(x)), H(q (z|x))=0 as q is deterministic, q(z|x)=δ(z=z(x)) denotes the deterministic encoder, p denotes induced decoder distribution whose negative log-likelihood is a target distortion function, p controls the rate-distortion trade-off, and $p_{prior}$ denotes the prior distribution for the latent. The second term is the codeword length of z when $p_{prior}$ is used in a variable-rate entropy coder. To reduce the average bit-rate of encoding z, it may be beneficial to use a probabilistic model to characterize latent distribution. The joint training of the FRAE together with a prior model is referred to herein as feedback recurrent variational autoencoder ("FR-VAE"). FRAE is a special case of FR-VAE with uniform $p_{prior}$ and hence constant bit-rate per time-step.

The design of FRAE facilitates a straightforward extension to its variational counterpart with an auto-regressive prior $p_{prior}(z_{t+1}|z \le_t)$. Since the decoder contains a recurrent network with $\{z_t, t \in \mathbb{N}\}$ as input, the decoder recurrent state $h_t$ can be reused as the conditioning of a prior model for the next latent $z_{t+1}$. In other words, $p_{prior}(z_{t+1}|z \le_t)$ can be parameterized as $p_{prior}(z_{t+1}|h_t)$, as shown in FIG. 7. In FIG. 7, operation of an implementation 700 of a feedback recurrent variational autoencoder corresponds to the implementation 200 of FIG. 2 with the addition of a model 702 (e.g., a relatively small addition to the FRAE structure) that receives the decoder recurrent state $h_t$ 754 and generates an output 756 to the quantizer 134. The implementation 700 may result in a better rate-distortion trade-off compared with a time-invariant prior model $p_{prior}(z_{t+1})$ and a prior model $p_{prior}(z_{t+1}|z_t)$ that is conditioned only on the previous code.

Illustrative, non-limiting examples of performance of various implementations described with reference to FIGS. 1-7 can be demonstrated in the context of speech spectrogram compression. An example demonstration associated with the effectiveness of FRAE compares its performance with other recurrent autoencoder designs of FIG. 6.

For purpose of such demonstration, recurrent autoencoder networks may be constructed using a combination of convolutional layers, fully-connected layers, and GRU layers, such as described with reference to FIG. 4, with a total of around 1.5 million parameters. For bottleneck discretization, each dimension may be quantized independently with a learned codebook of size four.

Regarding dataset, a LibriVox audiobook recording of Agnes Grey, a studio-quality single speaker dataset, may be used with 2.3 hours for training and 13 minutes for testing. The train/test split may have a disjoint set of speakers and utterances and includes gender distribution. Each data sample x is the spectrogram of a speech corpus, with $x_t$ representing a single frame of spectrogram at decibel (dB) scale. A Mel-scale mean-square-error is used as reconstruction loss for training, where the MSE of each frequency bin is scaled according to its weight at Mel-frequency.

In the demonstration, the performance of different recurrency auto-encoding schemes of FIG. 6 are compared with the FRAE implementation 200 of FIG. 2. A wide-band (16 KHz) audiobook is used having spectrograms computed from square-root Hanning windowed short-time Fourier transform (STFT) with step size of 160 and window size (same as fast Fourier transform (FFT)-size) of 320, corresponding to a frame rate of 100 Hz. With bottleneck dimension fixed to be 8 and a codebook of size 4, the spectrogram is compressed at a bit-rate of 1.6 kilobits per second (Kbps). The models are also evaluated by converting the transcoded spectrogram back into time-domain by Inverse-STFT and the Perceptual Objective Listening Quality Analysis (POLQA) score with respect to the ground-truth waveform is obtained. The phase of the spectrogram is either taken from the original (genie phase) or computed by running Griffin-Lim algorithm for 100 iterations. The performance comparison is detailed in Table 1. For all three metrics, FRAE outperforms the rest with a significant margin, which demonstrates the effectiveness of the feedback recurrent design.

TABLE 1

| Recurrency scheme | Mel-scale MSE | POLQA score | |
|---|---|---|---|
| | | original phase | Griffin-Lim 100-iter |
| (a) No recurrency | 18.369 | 2.404 | 1.489 |
| (b) Encoder only | 18.343 | 2.507 | 1.566 |
| (c) Decoder only | 16.389 | 3.091 | 1.878 |
| (d) Separate | 14.283 | 3.588 | 2.174 |
| (e) Latent feedback | 14.475 | 3.589 | 2.131 |
| (f) Output feedback | 13.915 | 3.594 | 2.159 |
| FRAE | 13.003 | 3.929 | 2.350 |

Figure 8:
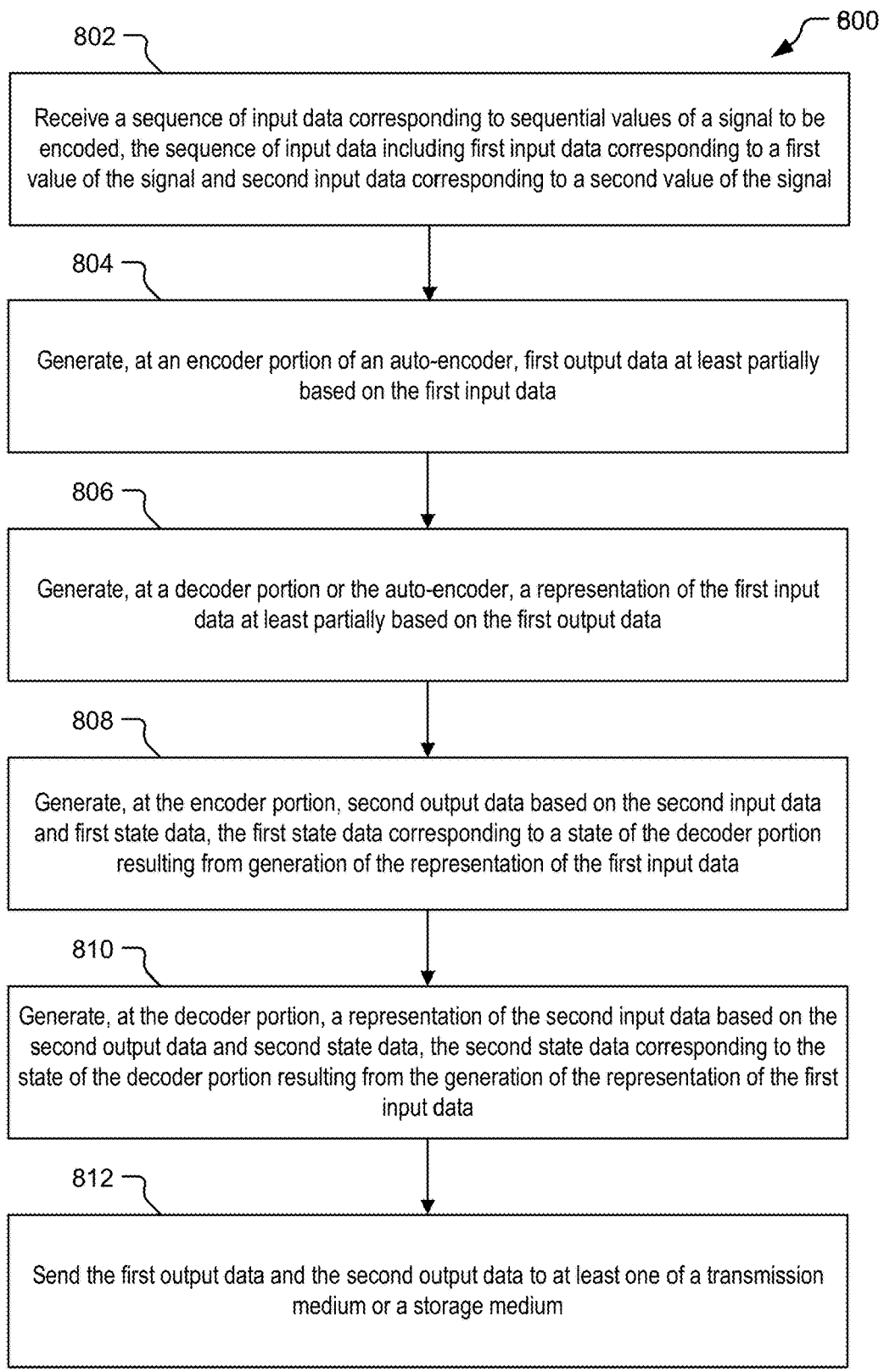
FIG. 8 is a diagram of a particular implementation of a method of signal encoding that may be performed by the device of FIG. 1.

Referring to FIG. 8, a particular implementation of a method 600 of signal encoding is depicted that may be performed by the first neural network 133, the quantizer 134, the second neural network 138, the encoder portion 132, the decoder portion 136, the autoencoder 130, the processor 104, the device 102 of FIG. 1, one or more components depicted in FIGS. 2-10, or any combination thereof.

The method 800 includes receiving a sequence of input data corresponding to sequential values of a signal to be encoded, at 802. The sequence of input data includes first input data corresponding to a first value of the signal and second input data corresponding to a second value of the signal. In an illustrative example, the sequence of input data corresponds to the sequence 120 of FIG. 1.

The method 800 includes generating, at an encoder portion of an autoencoder, first output data at least partially based on first input data, at 804. For example, the encoder portion 132 of the autoencoder 130 generates the output data 144 at least partially based on the input data 140, as described with reference to FIG. 1.

The method 800 also includes generating, at a decoder portion or the autoencoder, a representation of the first input data at least partially based on the first output data, at 806. For example, the decoder portion 136 or the autoencoder 130 generates the representation 146 of the input data 140 at least partially based on the output data 144, as described with reference to FIG. 1.

The method 800 further includes generating, at the encoder portion, second output data based on second input data and first state data, at 808. For example, the encoder portion 132 generates the second output data 244 based on the second input data 240 and the first state data 150, as described with reference to FIGS. 1-7. The first state data 150 corresponds to a state of the decoder portion 136 resulting from generation of the representation 146 of the input data 140.

The method 800 also includes generating, at the decoder portion, a representation of the second input data based on the second output data and second state data, at 810. For example, the decoder portion 136 generates the representation 246 of the second input data 240 based on the second output data 244 and the second state data 152, as described with reference to FIGS. 1-7. The second state data 152 corresponds to the state of the decoder portion 136 resulting from the generation of the representation 146 of the input data 140.

The method 800 further includes sending the first output data and the second output data to at least one of a transmission medium or a storage medium, at 812. For example, the processor 104 is configured to send the output data 144 and the second output data 244 to at least one of the transmission medium 118 or the storage medium 114, as described with reference to FIG. 1.

In some implementations, the method 800 also performing, at the encoder portion, lossy compression of the second input data to generate the second output data. For example, the encoder portion 132 performs lossy compression of the second input data 240 to generate the second output data 244, as described with reference to FIG. 1.

In some implementations, the method 800 includes generating the first input data based on a spectral characteristic of at least a portion of the audio data. For example, the processor 104 is configured to generate the input data 140 based on a spectral characteristic 516 of at least a portion of the audio data 109, as described with reference to FIG. 5.

In some implementations, the method 800 includes generating the second output data further based on the first output data. For example, the encoder portion 132 generates the second output data 244 based on the output data 144, as described with reference to FIG. 2.

In some implementations, the method 800 includes performing, based on a first clockwork recurrent neural network that receives the first state data, generating the second output data at the encoder portion, and performing, based on a second clockwork recurrent neural network that receives the second state data, generating a representation of the second input data at the decoder portion.

The method 800 of FIG. 8 may be implemented by a field-programmable gate array (FPGA) device, an application-specific integrated circuit (ASIC), a processing unit such as a central processing unit (CPU), a DSP, a controller, another hardware device, firmware device, or any combination thereof. As an example, the method 800 of FIG. 8 may be performed by a processor that executes instructions, such as described with reference to the processor 104 of FIG. 1.

Figure 9:
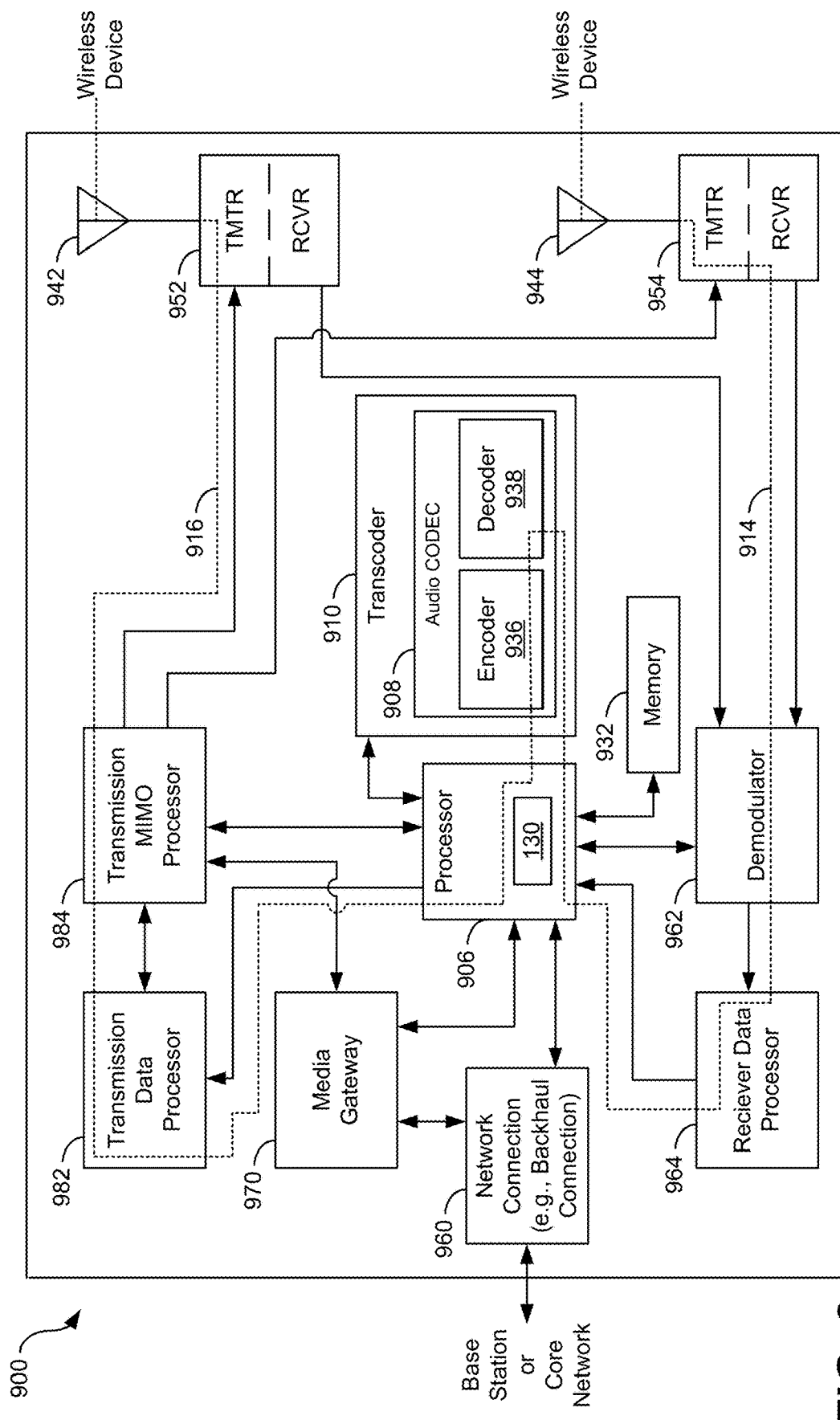
FIG. 9 is an illustrative example of a base station that is operable to perform signal encoding.

Referring to FIG. 9, a block diagram of a particular illustrative example of a base station 900 is depicted. In various implementations, the base station 900 may have more components or fewer components than illustrated in FIG. 9. In an illustrative example, the base station 900 may include one or more components of the device 102 of FIG. 1. In an illustrative example, the base station 900 may operate according to one or more of the methods or systems described with reference to FIGS. 1-8.

The base station 900 may be part of a wireless communication system. The wireless communication system may include multiple base stations and multiple wireless devices. The wireless communication system may be a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1X, Evolution-Data Optimized (EVDO), Time Division Synchronous CDMA (TD-SCDMA), or some other version of CDMA.

The wireless devices may also be referred to as user equipment (UE), a mobile station, a terminal, an access terminal, a subscriber unit, a station, etc. The wireless devices may include a cellular phone, a smartphone, a tablet, a wireless modem, a personal digital assistant (PDA), a handheld device, a laptop computer, a smartbook, a netbook, a tablet, a cordless phone, a wireless local loop (WLL) station, a Bluetooth device, etc. The wireless devices may include or correspond to the device 1000 of FIG. 10.

Various functions may be performed by one or more components of the base station 900 (and/or in other components not shown), such as sending and receiving messages and data (e.g., audio data). In a particular example, the base station 900 includes a processor 906 (e.g., a CPU). The processor 906 includes the autoencoder 130. In a particular aspect, the audio CODEC 908 includes the autoencoder 130. In a particular example, the encoder 936 includes the encoder portion 132 of FIG. 1. In a particular example, the decoder 938 includes the decoder portion 136 of FIG. 1. The base station 900 may include a transcoder 910. The transcoder 910 may include an audio CODEC 908. For example, the transcoder 910 may include one or more components (e.g., circuitry) configured to perform operations of the audio CODEC 908. As another example, the transcoder 910 may be configured to execute one or more computer-readable instructions to perform the operations of the audio CODEC 908. Although the audio CODEC 908 is illustrated as a component of the transcoder 910, in other examples one or more components of the audio CODEC 908 may be included in the processor 906, another processing component, or a combination thereof. For example, a decoder 938 (e.g., a vocoder decoder) may be included in a receiver data processor 964. As another example, an encoder 936 (e.g., a vocoder encoder) may be included in a transmission data processor 982.

The transcoder 910 may function to transcode messages and data between two or more networks. The transcoder 910 may be configured to convert message and audio data from a first format (e.g., a digital format) to a second format. To illustrate, the decoder 938 may decode encoded signals having a first format and the encoder 936 may encode the decoded signals into encoded signals having a second format. Additionally or alternatively, the transcoder 910 may be configured to perform data rate adaptation. For example, the transcoder 910 may down-convert a data rate or up-convert the data rate without changing a format the audio data. To illustrate, the transcoder 910 may down-convert 94 kbit/s signals into 16 kbit/s signals.

The base station 900 may include a memory 932. The memory 932, such as a computer-readable storage device, may include instructions. The instructions may include one or more instructions that are executable by the processor 906, the transcoder 910, or a combination thereof, to perform one or more operations described with reference to the methods and systems of FIGS. 1-8. The base station 900 may include multiple transmitters and receivers (e.g., transceivers), such as a first transceiver 952 and a second transceiver 954, coupled to an array of antennas. The array of antennas may include a first antenna 942 and a second antenna 944. The array of antennas may be configured to wirelessly communicate with one or more wireless devices, such as the device 1000 of FIG. 10. For example, the second antenna 944 may receive a data stream 914 (e.g., a bitstream) from a wireless device. The data stream 914 may include messages, data (e.g., encoded speech data), or a combination thereof.

The base station 900 may include a network connection 960, such as backhaul connection. The network connection 960 may be configured to communicate with a core network or one or more base stations of the wireless communication network. For example, the base station 900 may receive a second data stream (e.g., messages or audio data) from a core network via the network connection 960. The base station 900 may process the second data stream to generate messages or audio data and provide the messages or the audio data to one or more wireless device via one or more antennas of the array of antennas or to another base station via the network connection 960. In a particular implementation, the network connection 960 may be a wide area network (WAN) connection, as an illustrative, non-limiting example. In some implementations, the core network may include or correspond to a Public Switched Telephone Network (PSTN), a packet backbone network, or both.

The base station 900 may include a media gateway 970 that is coupled to the network connection 960 and the processor 906. The media gateway 970 may be configured to convert between media streams of different telecommunications technologies. For example, the media gateway 970 may convert between different transmission protocols, different coding schemes, or both. To illustrate, the media gateway 970 may convert from PCM signals to Real-Time Transport Protocol (RTP) signals, as an illustrative, non-limiting example. The media gateway 970 may convert data between packet switched networks (e.g., a Voice Over Internet Protocol (VoIP) network, an IP Multimedia Subsystem (IMS), a fourth generation (4G) wireless network, such as LTE, WiMax, and UMB, etc.), circuit switched networks (e.g., a PSTN), and hybrid networks (e.g., a second generation (2G) wireless network, such as GSM, GPRS, and EDGE, a third generation (3G) wireless network, such as WCDMA, EV-DO, and HSPA, etc.).

Additionally, the media gateway 970 may include a transcode and may be configured to transcode data when codecs are incompatible. For example, the media gateway 970 may transcode between an Adaptive Multi-Rate (AMR) codec and a G.711 codec, as an illustrative, non-limiting example. The media gateway 970 may include a router and a plurality of physical interfaces. In some implementations, the media gateway 970 may also include a controller (not shown). In a particular implementation, the media gateway controller may be external to the media gateway 970, external to the base station 900, or both. The media gateway controller may control and coordinate operations of multiple media gateways. The media gateway 970 may receive control signals from the media gateway controller and may function to bridge between different transmission technologies and may add service to end-user capabilities and connections.

The base station 900 may include a demodulator 962 that is coupled to the transceivers 952, 954, the receiver data processor 964, and the processor 906, and the receiver data processor 964 may be coupled to the processor 906. The demodulator 962 may be configured to demodulate modulated signals received from the transceivers 952, 954 and to provide demodulated data to the receiver data processor 964. The receiver data processor 964 may be configured to extract a message or audio data from the demodulated data and send the message or the audio data to the processor 906.

The base station 900 may include a transmission data processor 982 and a transmission multiple input-multiple output (MIMO) processor 984. The transmission data processor 982 may be coupled to the processor 906 and the transmission MIMO processor 984. The transmission MIMO processor 984 may be coupled to the transceivers 952, 954 and the processor 906. In some implementations, the transmission MIMO processor 984 may be coupled to the media gateway 970. The transmission data processor 982 may be configured to receive the messages or the audio data from the processor 906 and to code the messages or the audio data based on a coding scheme, such as CDMA or orthogonal frequency-division multiplexing (OFDM), as an illustrative, non-limiting examples. The transmission data processor 982 may provide the coded data to the transmission MIMO processor 984.

The coded data may be multiplexed with other data, such as pilot data, using CDMA or OFDM techniques to generate multiplexed data. The multiplexed data may then be modulated (i.e., symbol mapped) by the transmission data processor 982 based on a particular modulation scheme (e.g., Binary phase-shift keying ("BPSK"), Quadrature phase-shift keying ("QSPK"), M-ary phase-shift keying ("M-PSK"), M-ary Quadrature amplitude modulation ("M-QAM"), etc.) to generate modulation symbols. In a particular implementation, the coded data and other data may be modulated using different modulation schemes. The data rate, coding, and modulation for each data stream may be determined by instructions executed by processor 906.

The transmission MIMO processor 984 may be configured to receive the modulation symbols from the transmission data processor 982 and may further process the modulation symbols and may perform beamforming on the data. For example, the transmission MIMO processor 984 may apply beamforming weights to the modulation symbols. The beamforming weights may correspond to one or more antennas of the array of antennas from which the modulation symbols are transmitted.

During operation, the second antenna 944 of the base station 900 may receive a data stream 914. The second transceiver 954 may receive the data stream 914 from the second antenna 944 and may provide the data stream 914 to the demodulator 962. The demodulator 962 may demodulate modulated signals of the data stream 914 and provide demodulated data to the receiver data processor 964. The receiver data processor 964 may extract audio data from the demodulated data and provide the extracted audio data to the processor 906.

The processor 906 may provide the audio data to the transcoder 910 for transcoding. The decoder 938 of the transcoder 910 may decode the audio data from a first format into decoded audio data and the encoder 936 may encode the decoded audio data into a second format. In some implementations, the encoder 936 may encode the audio data using a higher data rate (e.g., up-convert) or a lower data rate (e.g., down-convert) than received from the wireless device. In other implementations, the audio data may not be transcoded. Although transcoding (e.g., decoding and encoding) is illustrated as being performed by a transcoder 910, the transcoding operations (e.g., decoding and encoding) may be performed by multiple components of the base station 900. For example, decoding may be performed by the receiver data processor 964 and encoding may be performed by the transmission data processor 982. In other implementations, the processor 906 may provide the audio data to the media gateway 970 for conversion to another transmission protocol, coding scheme, or both. The media gateway 970 may provide the converted data to another base station or core network via the network connection 960.

Encoded audio data generated at the encoder 936, such as transcoded data, may be provided to the transmission data processor 982 or the network connection 960 via the processor 906. The transcoded audio data from the transcoder 910 may be provided to the transmission data processor 982 for coding according to a modulation scheme, such as OFDM, to generate the modulation symbols. The transmission data processor 982 may provide the modulation symbols to the transmission MIMO processor 984 for further processing and beamforming. The transmission MIMO processor 984 may apply beamforming weights and may provide the modulation symbols to one or more antennas of the array of antennas, such as the first antenna 942 via the first transceiver 952. Thus, the base station 900 may provide a transcoded data stream 916, that corresponds to the data stream 914 received from the wireless device, to another wireless device. The transcoded data stream 916 may have a different encoding format, data rate, or both, than the data stream 914. In other implementations, the transcoded data stream 916 may be provided to the network connection 960 for transmission to another base station or a core network.

In a particular implementation, one or more components of the systems and devices disclosed herein may be integrated into a decoding system or apparatus (e.g., an electronic device, a CODEC, or a processor therein), into an encoding system or apparatus, or both. In other implementations, one or more components of the systems and devices disclosed herein may be integrated into a wireless telephone, a tablet computer, a desktop computer, a laptop computer, a set top box, a music player, a video player, an entertainment unit, a television, a game console, a navigation device, a communication device, a personal digital assistant (PDA), a fixed location data unit, a personal media player, or another type of device.

According to some implementations, the autoencoder 130 may be integrated into a server, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a headset, an augmented realty headset, a mixed reality headset, a virtual reality headset, a motor vehicle such as a car, or any combination thereof.

Figure 10:
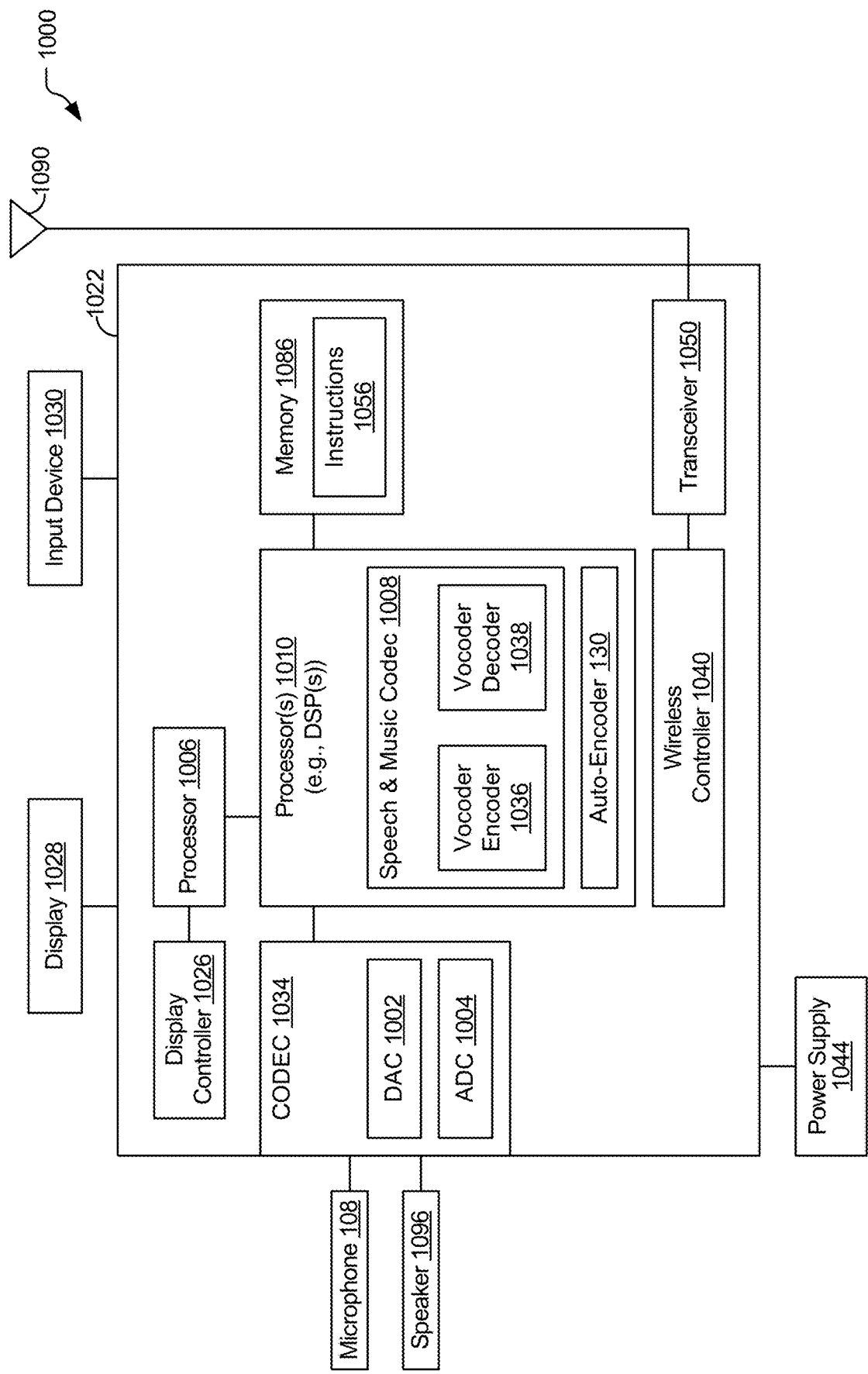
FIG. 10 is a block diagram of a particular illustrative example of a device that is operable to perform signal encoding.

Referring to FIG. 10, a block diagram of a particular illustrative implementation of a device is depicted and generally designated 1000. In various implementations, the device 1000 may have more or fewer components than illustrated in FIG. 10. In an illustrative implementation, the device 1000 may correspond to the device 102 of FIG. 1. In an illustrative implementation, the device 1000 may perform one or more operations described with reference to FIGS. 1-8.

In a particular implementation, the device 1000 includes a processor 1006 (e.g., a central processing unit (CPU)). The device 1000 may include one or more additional processors 1010 (e.g., one or more DSPs). The processors 1010 may include a speech and music coder-decoder (CODEC) 1008 and the autoencoder 130. The speech and music codec 1008 may include a voice coder ("vocoder") encoder 1036, a vocoder decoder 1038, or both. In a particular aspect, the vocoder encoder 1036 includes the encoder portion 132 of FIG. 1. In a particular aspect, the vocoder decoder 1038 includes the decoder portion 136.

The device 1000 may include a memory 1086 and a CODEC 1034. The memory 1086 may include instructions 1056 that are executable by the one or more additional processors 1010 (or the processor 1006) to implement the functionality described with reference to the autoencoder 130. The device 1000 may include a wireless controller 1040 coupled, via a transceiver 1050, to an antenna 1090.

The device 1000 may include a display 1028 coupled to a display controller 1026. A speaker 1096 and the microphone 108 may be coupled to the CODEC 1034. The CODEC 1034 may include a digital-to-analog converter 1002 and an analog-to-digital converter 1004. In a particular implementation, the CODEC 1034 may receive an analog signal from the microphone 108, convert the analog signal to a digital signal using the analog-to-digital converter 1004, and provide the digital signal to the speech and music codec 1008. The speech and music codec 1008 may process the digital signals. In a particular implementation, the speech and music codec 1008 may provide digital signals to the CODEC 1034. The CODEC 1034 may convert the digital signals to analog signals using the digital-to-analog converter 1002 and may provide the analog signals to the speaker 1096.

In a particular implementation, the device 1000 may be included in a system-in-package or system-on-chip device 1022 that corresponds to device 102 of FIG. 1, or any combination thereof. In a particular implementation, the memory 1086, the processor 1006, the processors 1010, the display controller 1026, the CODEC 1034, and the wireless controller 1040 are included in a system-in-package or system-on-chip device 1022. In a particular implementation, an input device 1030 and a power supply 1044 are coupled to the system-on-chip device 1022. Moreover, in a particular implementation, as illustrated in FIG. 10, the display 1028, the input device 1030, the speaker 1096, the microphone 108, the antenna 1090, and the power supply 1044 are external to the system-on-chip device 1022. In a particular implementation, each of the display 1028, the input device 1030, the speaker 1096, the microphone 108, the antenna 1090, and the power supply 1044 may be coupled to a component of the system-on-chip device 1022, such as an interface or a controller.

The device 1000 may include a smart speaker (e.g., the processor 1006 may execute the instructions 1056 to run a voice-controlled digital assistant application), a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, or any combination thereof.

In conjunction with the described implementations, an apparatus includes means for generating output data based on input data and first state data. For example, the means for generating the output data includes the first neural network 133, the quantizer 134, the encoder portion 132, the autoencoder 130, the processor 104, the device 102 of FIG. 1, the speech and music codec 1008, the processor 1006, the processors 1010, one or more other circuits or components configured to generate output data based on input data and first state data, or any combination thereof.

The apparatus also includes means for generating a representation of the input data based on the output data and second state data. For example, the means for generating a representation includes the second neural network 138, the decoder portion 136, the autoencoder 130, the processor 104, the device 102 of FIG. 1, the speech and music codec 808, the processor 806, the processors 810, one or more other circuits or components configured to generate a representation of the input data based on the output data and second state data, or any combination thereof.

The apparatus further includes means for sending the output data to at least one of a transmission medium or a storage medium. For example, the means for sending includes the processor 104, the device 102 of FIG. 1, the speech and music codec 1008, the processor 1006, the processors 1010, the wireless controller 1040, the transceiver 1050, the antenna 1090, one or more other circuits or components configured to send the second output data to at least one of a transmission medium or a storage medium, or any combination thereof. The first state data 150 corresponds to a state, of the means for generating the representation of the input data, resulting from generation of a representation of prior input data. The second state data 152 corresponds to the state, of the means for generating the representation of the input data, resulting from the generation of the representation of the prior input data.

In some implementations, a non-transitory computer-readable medium includes instructions that, when executed by one or more processors of a device, cause the one or more processors to generate, at an encoder portion of an autoencoder, first output data at least partially based on first input data. The instructions, when executed by the one or more processors, cause the one or more processors to also generate, at a decoder portion or the autoencoder, a representation of the first input data at least partially based on the first output data. The instructions, when executed by the one or more processors, cause the one or more processors to further generate, at the encoder portion, second output data based on second input data and first state data. The first state data corresponds to a state of the decoder portion resulting from generation of the representation of the first input data. The instructions, when executed by the one or more processors, cause the one or more processors to also generate, at the decoder portion, a representation of the second input data based on the second output data and second state data. The second state data corresponds to the state of the decoder portion resulting from the generation of the representation of the first input data. The instructions, when executed by the one or more processors, cause the one or more processors to further send the first output data and the second output data to at least one of a transmission medium or a storage medium.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein and is to be accorded the widest scope possible consistent with the principles and novel features as defined by the following claims.

What is claimed is:

1. A device to perform signal encoding, the device comprising:
one or more processors configured to:
receive a sequence of input data corresponding to sequential values of a signal to be encoded, the sequence of input data including first input data corresponding to a first value of the signal and second input data corresponding to a second value of the signal;
generate, at an encoder portion of an autoencoder, first output data at least partially based on the first input data;
generate, at a decoder portion or the autoencoder, a representation of the first input data at least partially based on the first output data;
generate, at the encoder portion, second output data based on the second input data and first state data, the first state data corresponding to a state of the decoder portion resulting from generation of the representation of the first input data;
generate, at the decoder portion, a representation of the second input data based on the second output data and second state data, the second state data corresponding to the state of the decoder portion resulting from the generation of the representation of the first input data; and send the first output data and the second output data to at least one of a transmission medium or a storage medium.

2. The device of claim 1, wherein the encoder portion includes a first neural network and wherein the decoder portion includes a second neural network.

3. The device of claim 2, wherein the state of the decoder portion includes one or more values of nodes within the second neural network.

4. The device of claim 1, wherein the first state data matches the second state data.

5. The device of claim 1, wherein the first output data has fewer bits than the first input data and the second output data has fewer bits than the second input data.

6. The device of claim 1, wherein the encoder portion is configured to perform lossy compression of the second input data to generate the second output data.

7. The device of claim 1, wherein the autoencoder in included in an audio encoder, and wherein the second input data corresponds to audio data received at the one or more processors.

8. The device of claim 7, wherein the audio encoder further includes a signal processor configured to generate the first input data based on a spectral characteristic of at least a portion of the audio data.

9. The device of claim 7, further comprising at least one microphone configured to provide the audio data to the one or more processors.

10. The device of claim 1, wherein the encoder portion is configured to generate the second output data further based on the first output data.

11. The device of claim 1, wherein the autoencoder comprises a variational autoencoder.

12. The device of claim 1, wherein the encoder portion includes a first clockwork recurrent neural network configured to receive the first state data and the decoder portion includes a second clockwork recurrent neural network configured to receive the second state data.

13. The device of claim 1, further comprising:
a memory coupled to the one or more processors and configured to store instructions executable by the one or more processors; and
a wireless transceiver coupled to an antenna and to the one or more processors and operable to transmit the second output data to a remote device,
wherein the one or more processors, the memory, and the wireless transceiver are incorporated into a portable electronic device.

14. The device of claim 1, wherein the one or more processors are incorporated into a base station.

15. A method of signal encoding, the method comprising:
receiving a sequence of input data corresponding to sequential values of a signal to be encoded, the sequence of input data including first input data corresponding to a first value of the signal and second input data corresponding to a second value of the signal;
generating, at an encoder portion of an autoencoder, first output data at least partially based on the first input data;
generating, at a decoder portion or the autoencoder, a representation of the first input data at least partially based on the first output data;
generating, at the encoder portion, second output data based on the second input data and first state data, the first state data corresponding to a state of the decoder portion resulting from generation of the representation of the first input data;
generating, at the decoder portion, a representation of the second input data based on the second output data and second state data, the second state data corresponding to the state of the decoder portion resulting from the generation of the representation of the first input data; and
sending the first output data and the second output data to at least one of a transmission medium or a storage medium.

16. The method of claim 15, wherein the encoder portion includes a first neural network and wherein the decoder portion includes a second neural network.

17. The method of claim 16, wherein the state of the decoder portion includes one or more values of nodes within the second neural network.

18. The method of claim 15, wherein the first state data matches the second state data.

19. The method of claim 15, wherein the first output data has fewer bits than the first input data and the second output data has fewer bits than the second input data.

20. The method of claim 15, wherein the encoder portion performs lossy compression of the second input data to generate the second output data.

21. The method of claim 15, wherein the second input data corresponds to audio data received at an audio encoder.

22. The method of claim 21, wherein the first input data is generated based on a spectral characteristic of at least a portion of the audio data.

23. The method of claim 15, wherein the second output data is generated further based on the first output data.

24. The method of claim 15, wherein the autoencoder includes a variational autoencoder.

25. The method of claim 15, wherein generating the second output data at the encoder portion is performed based on a first clockwork recurrent neural network that receives the first state data and wherein generating a representation of the second input data at the decoder portion is performed based on a second clockwork recurrent neural network that receives the second state data.

26. A non-transitory computer-readable medium comprising instructions that, when executed by one or more processors of a device, cause the one or more processors to:
receive a sequence of input data corresponding to sequential values of a signal to be encoded, the sequence of input data including first input data corresponding to a first value of the signal and second input data corresponding to a second value of the signal;
generate, at an encoder portion of an autoencoder, first output data at least partially based on the first input data;
generate, at a decoder portion or the autoencoder, a representation of the first input data at least partially based on the first output data;
generate, at the encoder portion, second output data based on the second input data and first state data, the first state data corresponding to a state of the decoder portion resulting from generation of the representation of the first input data;
generate, at the decoder portion, a representation of the second input data based on the second output data and second state data, the second state data corresponding to the state of the decoder portion resulting from the generation of the representation of the first input data; and send the first output data and the second output data to at least one of a transmission medium or a storage medium.

27. The non-transitory computer-readable medium of claim 26, wherein the sequence of input data corresponds to audio data received at an audio encoder.

28. The non-transitory computer-readable medium of claim 27, wherein first input data is generated based on a spectral characteristic of at least a portion of the audio data.

29. An apparatus to perform signal encoding, the apparatus comprising:
   means for generating output data based on input data and first state data;
   means for generating a representation of the input data based on the output data and second state data; and
   means for sending the output data to at least one of a transmission medium or a storage medium,
   wherein the first state data corresponds to a state, of the means for generating the representation of the input data, resulting from generation of a representation of prior input data, the prior input data and the input data corresponding to sequential values of a signal to be encoded, and
   wherein the second state data corresponds to the state, of the means for generating the representation of the input data, resulting from the generation of the representation of the prior input data.

30. The apparatus of claim 29, wherein the prior input data and the input data correspond to audio data.

* * * * *